US012634448B2

(12) United States Patent

Peringassery Krishnan et al.

(10) Patent No.: US 12,634,448 B2

(45) Date of Patent: May 19, 2026

(54) SYSTEMS AND METHODS FOR GENERATING INTRA MODE TABLES

(71) Applicant: Tencent America LLC, Palo Alto, CA (US)

(72) Inventors: Madhu Peringassery Krishnan, Palo Alto, CA (US); Liang Zhao, Palo Alto, CA (US); Jing Ye, Palo Alto, CA (US); Xin Zhao, Palo Alto, CA (US); Yushin Cho, Palo Alto, CA (US); Tianqi Liu, Palo Alto, CA (US); Han Gao, Palo Alto, CA (US); Shan Liu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 38 days.

(21) Appl. No.: 18/669,385

(22) Filed: May 20, 2024

(65) Prior Publication Data

US 2025/0184480 A1 Jun. 5, 2025

Related U.S. Application Data

(60) Provisional application No. 63/604,751, filed on Nov. 30, 2023.

(51) Int. Cl.
  *H04N 19/11* (2014.01)
  *H04N 19/159* (2014.01)
  *H04N 19/176* (2014.01)
(52) U.S. Cl.
  CPC ........... *H04N 19/11* (2014.11); *H04N 19/159* (2014.11); *H04N 19/176* (2014.11)

(58) Field of Classification Search
  None
  See application file for complete search history.

(56) References Cited

U.S. PATENT DOCUMENTS

| | | | |
|---|---|---|---|
| 11,575,908 B2 * | 2/2023 | Wang | H04N 19/159 |
| 12,206,894 B2 * | 1/2025 | Kim | H04N 19/593 |

(Continued)

FOREIGN PATENT DOCUMENTS

| | | |
|---|---|---|
| WO | WO 2020/141123 A1 | 7/2020 |
| WO | WO 2023/185933 A1 | 10/2023 |

OTHER PUBLICATIONS

Tencent America LLC, ISRWO, PCT/US2024/030575, Aug. 7, 2024, 16 pgs.

*Primary Examiner* — Mohammad J Rahman

(74) *Attorney, Agent, or Firm* — Morgan, Lewis & Bockius LLP

(57) ABSTRACT

An example method of video coding includes receiving a video bitstream including a plurality of blocks; receiving a video bitstream that includes a current picture, the current picture including a plurality of blocks that includes a current block. The method includes constructing an intra prediction mode table by adding an entry corresponding to an intra prediction mode to the intra prediction mode table based on one or more intra prediction modes used by one or more previously decoded blocks; and deriving an intra mode prediction list for the current block by selecting one or more entries from the constructed intra prediction mode table. The method also includes reconstructing the current block using an intra prediction mode from the intra prediction mode list.

20 Claims, 6 Drawing Sheets

(56) References Cited

U.S. PATENT DOCUMENTS

| | | | |
|---|---|---|---|
| 2018/0176587 A1* | 6/2018 | Panusopone | H04N 19/82 |
| 2020/0344469 A1* | 10/2020 | Coban | H04N 19/11 |
| 2020/0374554 A1 | 11/2020 | Koo et al. | |
| 2021/0051320 A1* | 2/2021 | Tourapis | H04N 19/186 |
| 2021/0185326 A1* | 6/2021 | Wang | H04N 19/176 |
| 2021/0195238 A1* | 6/2021 | Moon | H04N 19/105 |
| 2021/0266532 A1* | 8/2021 | Henry | H04N 19/129 |
| 2021/0321132 A1* | 10/2021 | Huo | H04N 19/176 |
| 2021/0360231 A1 | 11/2021 | Heo et al. | |
| 2022/0182665 A1 | 6/2022 | Li et al. | |
| 2022/0182667 A1* | 6/2022 | Li | H04N 19/593 |

* cited by examiner

Figure 1:
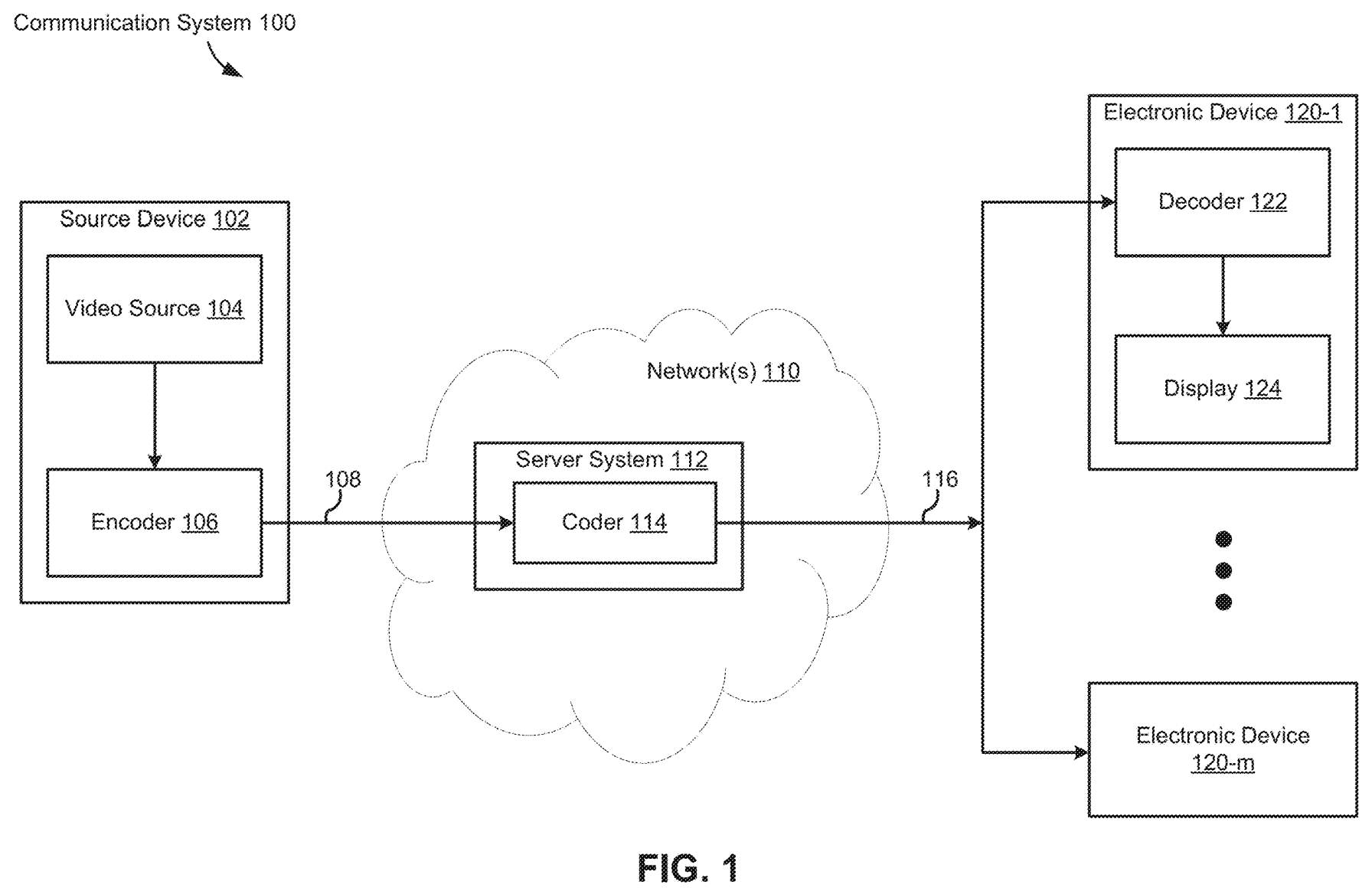

Communication System 100

Electronic Device 120-1

Decoder 122

Display 124

Electronic Device 120-m

116

Network(s) 110

Server System 112

Coder 114

108

Source Device 102

Video Source 104

Encoder 106

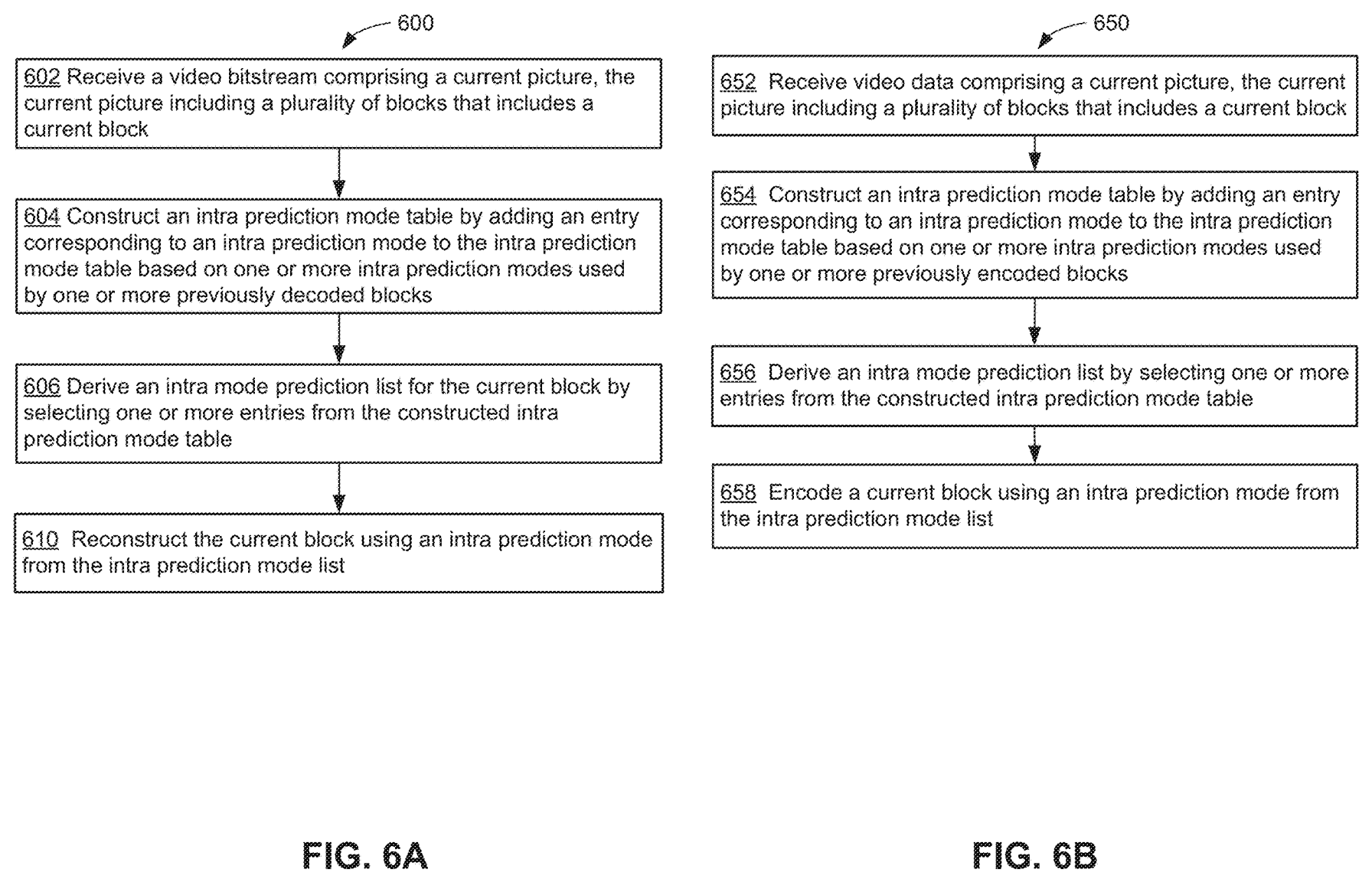

602 Receive video data comprising a current picture, the current picture including a plurality of blocks that includes a current block 654 Construct an intra prediction mode table by adding an entry corresponding to an intra prediction mode to the intra prediction mode table based on one or more intra prediction modes used by one or more previously encoded blocks 656 Derive an intra mode prediction list by selecting one or more entries from the constructed intra prediction mode table 658 Encode a current block using an intra prediction mode from the intra prediction mode list

602 Receive a video bitstream comprising a current picture, the current picture including a plurality of blocks that includes a current block 604 Construct an intra prediction mode table by adding an entry corresponding to an intra prediction mode to the intra prediction mode table based on one or more intra prediction modes used by one or more previously decoded blocks 606 Derive an intra mode prediction list for the current block by selecting one or more entries from the constructed intra prediction mode table 610 Reconstruct the current block using an intra prediction mode from the intra prediction mode list

FIG. 6A

SYSTEMS AND METHODS FOR GENERATING INTRA MODE TABLES

RELATED APPLICATIONS

This application claims priority to U.S. Provisional Patent Application No. 63/604,751, entitled "Intra Mode Tables" filed Nov. 30, 2023, which is hereby incorporated by reference in its entirety.

TECHNICAL FIELD

The disclosed embodiments relate generally to video coding, including but not limited to intra mode coding and systems and methods for generating and using intra mode tables.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit and receive or otherwise communicate digital video data across a communication network, and/or store the digital video data on a storage device. Due to a limited bandwidth capacity of the communication network and limited memory resources of the storage device, video coding may be used to compress the video data according to one or more video coding standards before it is communicated or stored. The video coding can be performed by hardware and/or software on an electronic/client device or a server providing a cloud service.

Video coding generally utilizes prediction methods (e.g., inter-prediction, intra-prediction, or the like) that take advantage of redundancy inherent in the video data. Video coding aims to compress video data into a form that uses a lower bit rate, while avoiding or minimizing degradations to video quality. Multiple video codec standards have been developed. For example, High-Efficiency Video Coding (HEVC/H.265) is a video compression standard designed as part of the MPEG-H project. ITU-T and ISO/IEC published the HEVC/H.265 standard in 2013 (version 1), 2014 (version 2), 2015 (version 3), and 2016 (version 4). Versatile Video Coding (VVC/H.266) is a video compression standard intended as a successor to HEVC. ITU-T and ISO/IEC published the VVC/H.266 standard in 2020 (version 1) and 2022 (version 2). AOMedia Video 1 (AV1) is an open video coding format designed as an alternative to HEVC. On Jan. 8, 2019, a validated version 1.0.0 with Errata 1 of the specification was released.

SUMMARY

The present disclosure describes amongst other things, a set of methods for video (image) compression, more specifically related to the generation and usage of an intra prediction mode table for coding of blocks. An advantage of using the intra prediction mode table is the improved efficiency and accuracy provided by the ability to access intra prediction modes of neighboring (including non-adjacent) blocks, particularly in cases where the neighboring blocks are not intra coded. The intra prediction mode table may allow more memory (e.g., in a buffer memory of a decoding or encoding component) to be allocated to storing intra prediction mode of blocks in a current frame, improving the accuracy of the coding, while only a flag (indicating which mode from the intra prediction mode table is to be used for the coding of a current block) is signaled in the bitstream.

In accordance with some embodiments, a method of video decoding includes (i) receiving a video bitstream (e.g., a coded video sequence) comprising a current picture, the current picture including a plurality of blocks that includes a current block, (ii) constructing (e.g., maintaining) an intra prediction mode table by adding an entry corresponding to an intra prediction mode to the intra prediction mode table based on one or more intra prediction modes used by one or more previously decoded blocks; (iii) deriving (e.g., or populating) an intra mode prediction list for the current block by selecting one or more entries from the constructed intra prediction mode table; and (iv) reconstructing the current block using an intra prediction mode from the intra prediction mode list.

In accordance with some embodiments, a method of video encoding includes (i) receiving video data comprising a current picture, the current picture including a plurality of blocks that includes a current block; (ii) constructing (e.g., maintaining) an intra prediction mode table by adding an entry corresponding to an intra prediction mode to the intra prediction mode table based on one or more intra prediction modes used by one or more previously encoded blocks; (iii) deriving (e.g., or populating) an intra mode prediction list by selecting one or more entries from the constructed intra prediction mode table; and (iv) encoding a current block using an intra prediction mode from the intra prediction mode list.

In accordance with some embodiments, a method of processing visual media data includes: (i) obtaining a source video sequence that includes a plurality of frames; and (ii) performing a conversion between the source video sequence and a video bitstream of visual media data, where the bitstream comprises: (a) a plurality of encoded blocks corresponding to the plurality of frames; and (b) a signaled flag indicating whether a block of the plurality of encoded blocks is to be decoded using an intra prediction mode table maintained at a decoder component, wherein the intra prediction mode table is not block-specific.

In accordance with some embodiments, a computing system is provided, such as a streaming system, a server system, a personal computer system, or other electronic device. The computing system includes control circuitry and memory storing one or more sets of instructions. The one or more sets of instructions including instructions for performing any of the methods described herein. In some embodiments, the computing system includes an encoder component and a decoder component (e.g., a transcoder).

In accordance with some embodiments, a non-transitory computer-readable storage medium is provided. The non-transitory computer-readable storage medium stores one or more sets of instructions for execution by a computing system. The one or more sets of instructions including instructions for performing any of the methods described herein.

Thus, devices and systems are disclosed with methods for encoding and decoding video. Such methods, devices, and systems may complement or replace conventional methods, devices, and systems for video encoding/decoding. The features and advantages described in the specification are not necessarily all-inclusive and, in particular, some additional features and advantages will be apparent to one of ordinary skill in the art in view of the drawings, specification, and claims provided in this disclosure. Moreover, it should be noted that the language used in the specification has been principally selected for readability and instructional purposes and has not necessarily been selected to delineate or circumscribe the subject matter described herein.

BRIEF DESCRIPTION OF THE DRAWINGS

So that the present disclosure can be understood in greater detail, a more particular description can be had by reference to the features of various embodiments, some of which are illustrated in the appended drawings. The appended drawings, however, merely illustrate pertinent features of the present disclosure and are therefore not necessarily to be considered limiting, for the description can admit to other effective features as the person of skill in this art will appreciate upon reading this disclosure.

FIG. 1 is a block diagram illustrating an example communication system in accordance with some embodiments.

FIG. 6A illustrates an example video decoding process in accordance with some embodiments.

FIG. 6B illustrates an example video encoding process in accordance with some embodiments.

In accordance with common practice, the various features illustrated in the drawings are not necessarily drawn to scale, and like reference numerals can be used to denote like features throughout the specification and figures.

DETAILED DESCRIPTION

Figure 2A:
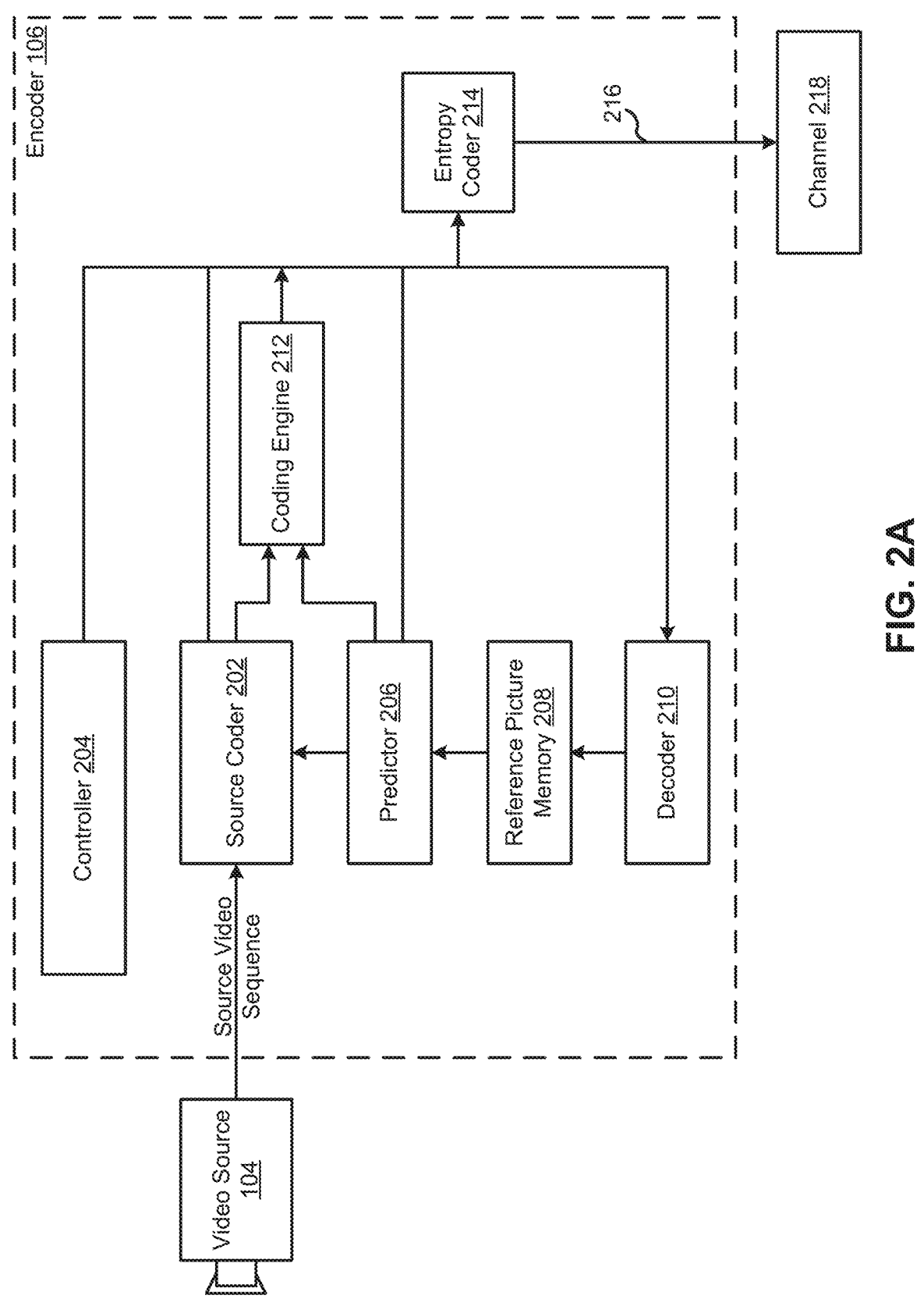
FIG. 2A is a block diagram illustrating example elements of an encoder component in accordance with some embodiments.

The present disclosure describes video/image compression techniques including implementing, updating, and applying intra prediction mode tables (also sometimes called intra mode tables) for coding of blocks. For example, an intra prediction mode table is maintained (e.g., at a decoder component) and the table keeps a record of intra prediction modes used by, or derived from, previously encoded or decoded blocks. An intra prediction mode table may be maintained (e.g., by adding an entry to the intra prediction mode table based on one or more intra prediction modes used by one or more previously decoded blocks) and used to populate at least a portion of an intra mode prediction list. An advantage of using the intra prediction mode table is improved efficiency/accuracy (e.g., by being able to select the most appropriate intra prediction mode). Additionally, the intra prediction mode table may allow more memory (e.g., in a buffer memory of a decoding or encoding component) to be allocated to storing intra prediction mode of blocks in a current frame.

Example Systems and Devices

FIG. 1 is a block diagram illustrating a communication system 100 in accordance with some embodiments. The communication system 100 includes a source device 102 and a plurality of electronic devices 120 (e.g., electronic device 120-1 to electronic device 120-*m*) that are communicatively coupled to one another via one or more networks. In some embodiments, the communication system 100** is a streaming system, e.g., for use with video-enabled applications such as video conferencing applications, digital TV applications, and media storage and/or distribution applications.

The source device 102 includes a video source 104 (e.g., a camera component or media storage) and an encoder component 106. In some embodiments, the video source 104 is a digital camera (e.g., configured to create an uncompressed video sample stream). The encoder component 106 generates one or more encoded video bitstreams from the video stream. The video stream from the video source 104 may be high data volume as compared to the encoded video bitstream 108 generated by the encoder component 106. Because the encoded video bitstream 108 is lower data volume (less data) as compared to the video stream from the video source, the encoded video bitstream 108 requires less bandwidth to transmit and less storage space to store as compared to the video stream from the video source 104. In some embodiments, the source device 102 does not include the encoder component 106 (e.g., is configured to transmit uncompressed video to the network(s) 110).

The one or more networks 110 represents any number of networks that convey information between the source device 102, the server system 112, and/or the electronic devices 120, including for example wireline (wired) and/or wireless communication networks. The one or more networks 110 may exchange data in circuit-switched and/or packet-switched channels. Representative networks include telecommunications networks, local area networks, wide area networks and/or the Internet.

The one or more networks 110 include a server system 112 (e.g., a distributed/cloud computing system). In some embodiments, the server system 112 is, or includes, a streaming server (e.g., configured to store and/or distribute video content such as the encoded video stream from the source device 102). The server system 112 includes a coder component 114 (e.g., configured to encode and/or decode video data). In some embodiments, the coder component 114 includes an encoder component and/or a decoder component. In various embodiments, the coder component 114 is instantiated as hardware, software, or a combination thereof. In some embodiments, the coder component 114 is configured to decode the encoded video bitstream 108 and re-encode the video data using a different encoding standard and/or methodology to generate encoded video data 116. In some embodiments, the server system 112 is configured to generate multiple video formats and/or encodings from the encoded video bitstream 108. In some embodiments, the server system 112 functions as a Media-Aware Network Element (MANE). For example, the server system 112 may be configured to prune the encoded video bitstream 108 for tailoring potentially different bitstreams to one or more of the electronic devices 120. In some embodiments, a MANE is provided separate from the server system 112.

The electronic device 120-1 includes a decoder component 122 and a display 124. In some embodiments, the decoder component 122 is configured to decode the encoded video data 116 to generate an outgoing video stream that can be rendered on a display or other type of rendering device. In some embodiments, one or more of the electronic devices 120 does not include a display component (e.g., is communicatively coupled to an external display device and/or includes a media storage). In some embodiments, the electronic devices 120 are streaming clients. In some embodiments, the electronic devices 120 are configured to access the server system 112 to obtain the encoded video data 116.

The source device and/or the plurality of electronic devices 120 are sometimes referred to as "terminal devices" or "user devices." In some embodiments, the source device 102 and/or one or more of the electronic devices 120 are instances of a server system, a personal computer, a portable device (e.g., a smartphone, tablet, or laptop), a wearable device, a video conferencing device, and/or other type of electronic device.

In example operation of the communication system 100, the source device 102 transmits the encoded video bitstream 108 to the server system 112. For example, the source device 102 may code a stream of pictures that are captured by the source device. The server system 112 receives the encoded video bitstream 108 and may decode and/or encode the encoded video bitstream 108 using the coder component 114. For example, the server system 112 may apply an encoding to the video data that is more optimal for network transmission and/or storage. The server system 112 may transmit the encoded video data 116 (e.g., one or more coded video bitstreams) to one or more of the electronic devices 120. Each electronic device 120 may decode the encoded video data 116 and optionally display the video pictures.

FIG. 2A is a block diagram illustrating example elements of the encoder component 106 in accordance with some embodiments. The encoder component 106 receives video data (e.g., a source video sequence) from the video source 104. In some embodiments, the encoder component includes a receiver (e.g., a transceiver) component configured to receive the source video sequence. In some embodiments, the encoder component 106 receives a video sequence from a remote video source (e.g., a video source that is a component of a different device than the encoder component 106). The video source 104 may provide the source video sequence in the form of a digital video sample stream that can be of any suitable bit depth (e.g., 8-bit, 10-bit, or 12-bit), any colorspace (e.g., BT.601 Y CrCB, or RGB), and any suitable sampling structure (e.g., Y CrCb 4:2:0 or Y CrCb 4:4:4). In some embodiments, the video source 104 is a storage device storing previously captured/prepared video. In some embodiments, the video source 104 is camera that captures local image information as a video sequence. Video data may be provided as a plurality of individual pictures that impart motion when viewed in sequence. The pictures themselves may be organized as a spatial array of pixels, where each pixel can include one or more samples depending on the sampling structure, color space, etc. in use. A person of ordinary skill in the art can readily understand the relationship between pixels and samples.

The encoder component 106 is configured to code and/or compress the pictures of the source video sequence into a coded video sequence 216 in real-time or under other time constraints as required by the application. In some embodiments, the encoder component 106 is configured to perform a conversion between the source video sequence and a bitstream of visual media data (e.g., a video bitstream). Enforcing appropriate coding speed is one function of a controller 204. In some embodiments, the controller 204 controls other functional units as described below and is functionally coupled to the other functional units. Parameters set by the controller 204 may include rate-control-related parameters (e.g., picture skip, quantizer, and/or lambda value of rate-distortion optimization techniques), picture size, group of pictures (GOP) layout, maximum motion vector search range, and so forth. A person of ordinary skill in the art can readily identify other functions of controller 204 as they may pertain to the encoder component 106 being optimized for a certain system design.

In some embodiments, the encoder component 106 is configured to operate in a coding loop. In a simplified example, the coding loop includes a source coder 202 (e.g., responsible for creating symbols, such as a symbol stream, based on an input picture to be coded and reference picture(s)), and a (local) decoder 210. The decoder 210 reconstructs the symbols to create the sample data in a similar manner as a (remote) decoder (when compression between symbols and coded video bitstream is lossless). The reconstructed sample stream (sample data) is input to the reference picture memory 208. As the decoding of a symbol stream leads to bit-exact results independent of decoder location (local or remote), the content in the reference picture memory 208 is also bit exact between the local encoder and remote encoder. In this way, the prediction part of an encoder interprets as reference picture samples the same sample values as a decoder would interpret when using prediction during decoding. This principle of reference picture synchronicity (and resulting drift, if synchronicity cannot be maintained, for example because of channel errors) is known to a person of ordinary skill in the art.

The operation of the decoder 210 can be the same as of a remote decoder, such as the decoder component 122, which is described in detail below in conjunction with FIG. 2B. Briefly referring to FIG. 2B, however, as symbols are available and encoding/decoding of symbols to a coded video sequence by an entropy coder 214 and the parser 254 can be lossless, the entropy decoding parts of the decoder component 122, including the buffer memory 252 and the parser 254 may not be fully implemented in the local decoder 210.

The decoder technology described herein, except the parsing/entropy decoding, may be to be present, in substantially identical functional form, in a corresponding encoder. For this reason, the disclosed subject matter focuses on decoder operation. The description of encoder technologies can be abbreviated as they may be the inverse of the decoder technologies.

As part of its operation, the source coder 202 may perform motion compensated predictive coding, which codes an input frame predictively with reference to one or more previously-coded frames from the video sequence that were designated as reference frames. In this manner, the coding engine 212 codes differences between pixel blocks of an input frame and pixel blocks of reference frame(s) that may be selected as prediction reference(s) to the input frame. The controller 204 may manage coding operations of the source coder 202, including, for example, setting of parameters and subgroup parameters used for encoding the video data.

The decoder 210 decodes coded video data of frames that may be designated as reference frames, based on symbols created by the source coder 202. Operations of the coding engine 212 may advantageously be lossy processes. When the coded video data is decoded at a video decoder (not shown in FIG. 2A), the reconstructed video sequence may be a replica of the source video sequence with some errors. The decoder 210 replicates decoding processes that may be performed by a remote video decoder on reference frames and may cause reconstructed reference frames to be stored in the reference picture memory 208. In this manner, the encoder component 106 stores copies of reconstructed reference frames locally that have common content as the reconstructed reference frames that will be obtained by a remote video decoder (absent transmission errors).

The predictor 206 may perform prediction searches for the coding engine 212. That is, for a new frame to be coded, the predictor 206 may search the reference picture memory 208 for sample data (as candidate reference pixel blocks) or certain metadata such as reference picture motion vectors, block shapes, and so on, that may serve as an appropriate prediction reference for the new pictures. The predictor 206 may operate on a sample block-by-pixel block basis to find appropriate prediction references. As determined by search results obtained by the predictor 206, an input picture may have prediction references drawn from multiple reference pictures stored in the reference picture memory 208.

Output of all aforementioned functional units may be subjected to entropy coding in the entropy coder 214. The entropy coder 214 translates the symbols as generated by the various functional units into a coded video sequence, by losslessly compressing the symbols according to technologies known to a person of ordinary skill in the art (e.g., Huffman coding, variable length coding, and/or arithmetic coding).

In some embodiments, an output of the entropy coder 214 is coupled to a transmitter. The transmitter may be configured to buffer the coded video sequence(s) as created by the entropy coder 214 to prepare them for transmission via a communication channel 218, which may be a hardware/software link to a storage device which would store the encoded video data. The transmitter may be configured to merge coded video data from the source coder 202 with other data to be transmitted, for example, coded audio data and/or ancillary data streams (sources not shown). In some embodiments, the transmitter may transmit additional data with the encoded video. The source coder 202 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and the like.

The controller 204 may manage operation of the encoder component 106. During coding, the controller 204 may assign to each coded picture a certain coded picture type, which may affect the coding techniques that are applied to the respective picture. For example, pictures may be assigned as an Intra Picture (I picture), a Predictive Picture (P picture), or a Bi-directionally Predictive Picture (B Picture). An Intra Picture may be coded and decoded without using any other frame in the sequence as a source of prediction. Some video codecs allow for different types of Intra pictures, including, for example Independent Decoder Refresh (IDR) Pictures. A person of ordinary skill in the art is aware of those variants of I pictures and their respective applications and features, and therefore they are not repeated here. A Predictive picture may be coded and decoded using intra prediction or inter prediction using at most one motion vector and reference index to predict the sample values of each block. A Bi-directionally Predictive Picture may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

The encoder component 106 may perform coding operations according to a predetermined video coding technology or standard, such as any described herein. In its operation, the encoder component 106 may perform various compression operations, including predictive coding operations that exploit temporal and spatial redundancies in the input video sequence. The coded video data, therefore, may conform to a syntax specified by the video coding technology or standard being used.

Figure 2B:
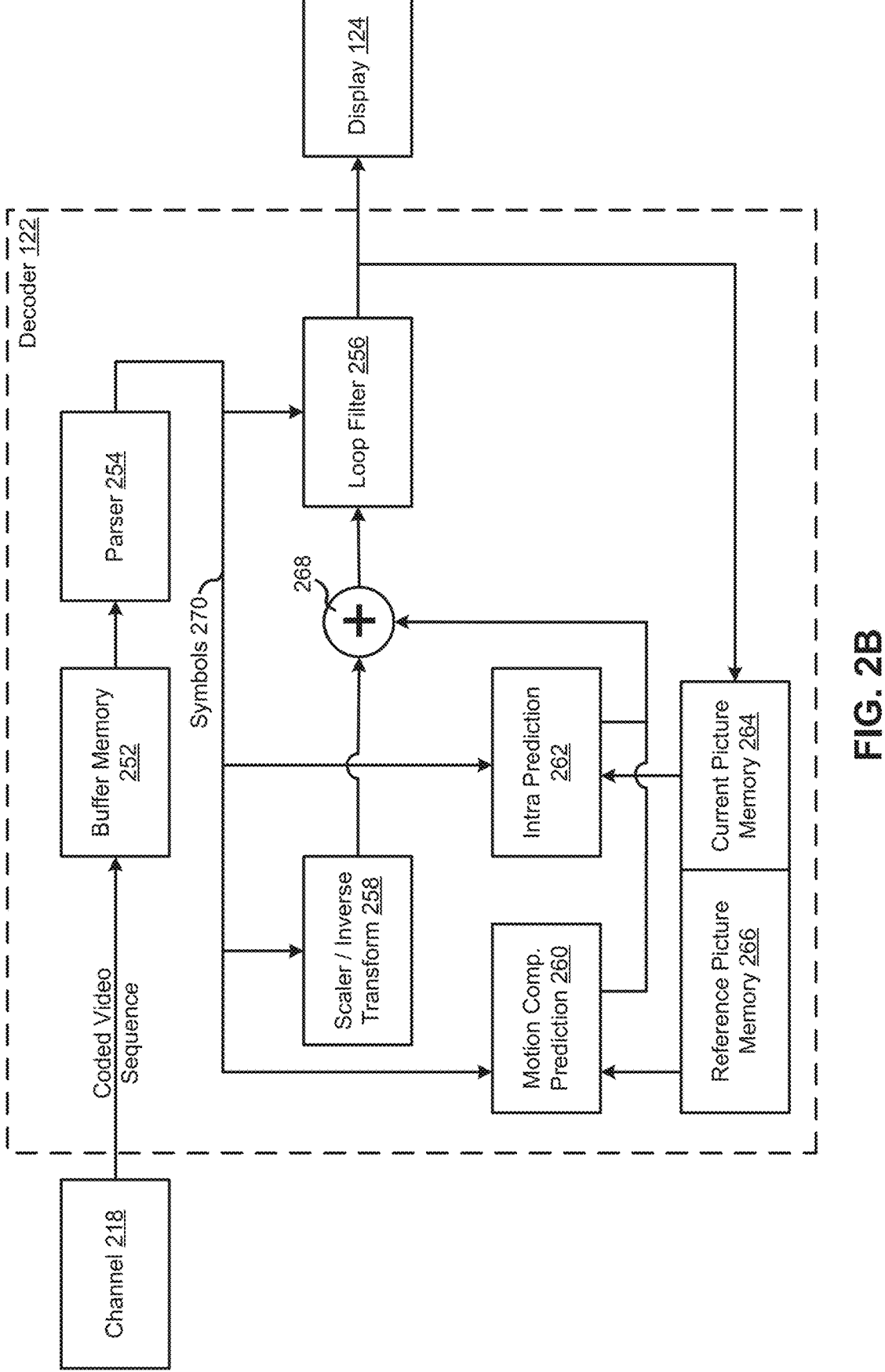
FIG. 2B is a block diagram illustrating example elements of a decoder component in accordance with some embodiments.

FIG. 2B is a block diagram illustrating example elements of the decoder component 122 in accordance with some embodiments. The decoder component 122 in FIG. 2B is coupled to the channel 218 and the display 124. In some embodiments, the decoder component 122 includes a transmitter coupled to the loop filter 256 and configured to transmit data to the display 124 (e.g., via a wired or wireless connection).

In some embodiments, the decoder component 122 includes a receiver coupled to the channel 218 and configured to receive data from the channel 218 (e.g., via a wired or wireless connection). The receiver may be configured to receive one or more coded video sequences to be decoded by the decoder component 122. In some embodiments, the decoding of each coded video sequence is independent from other coded video sequences. Each coded video sequence may be received from the channel 218, which may be a hardware/software link to a storage device which stores the encoded video data. The receiver may receive the encoded video data with other data, for example, coded audio data and/or ancillary data streams, that may be forwarded to their respective using entities (not depicted). The receiver may separate the coded video sequence from the other data. In some embodiments, the receiver receives additional (redundant) data with the encoded video. The additional data may be included as part of the coded video sequence(s). The additional data may be used by the decoder component 122 to decode the data and/or to more accurately reconstruct the original video data. Additional data can be in the form of, e.g., temporal, spatial, or SNR enhancement layers, redundant slices, redundant pictures, forward error correction codes, and so on.

In accordance with some embodiments, the decoder component 122 includes a buffer memory 252, a parser 254 (also sometimes referred to as an entropy decoder), a scaler/inverse transform unit 258, an intra picture prediction unit 262, a motion compensation prediction unit 260, an aggregator 268, the loop filter unit 256, a reference picture memory 266, and a current picture memory 264. In some embodiments, the decoder component 122 is implemented as an integrated circuit, a series of integrated circuits, and/or other electronic circuitry. The decoder component 122 may be implemented at least in part in software.

The buffer memory 252 is coupled in between the channel 218 and the parser 254 (e.g., to combat network jitter). In some embodiments, the buffer memory 252 is separate from the decoder component 122. In some embodiments, a separate buffer memory is provided between the output of the channel 218 and the decoder component 122. In some embodiments, a separate buffer memory is provided outside of the decoder component 122 (e.g., to combat network jitter) in addition to the buffer memory 252 inside the decoder component 122 (e.g., which is configured to handle playout timing). When receiving data from a store/forward device of sufficient bandwidth and controllability, or from an isosynchronous network, the buffer memory 252 may not be needed, or can be small. For use on best effort packet networks such as the Internet, the buffer memory 252 may be required, can be comparatively large and/or of adaptive size, and may at least partially be implemented in an operating system or similar elements outside of the decoder component 122.

The parser 254 is configured to reconstruct symbols 270 from the coded video sequence. The symbols may include, for example, information used to manage operation of the decoder component 122, and/or information to control a rendering device such as the display 124. The control information for the rendering device(s) may be in the form of, for example, Supplementary Enhancement Information (SEI) messages or Video Usability Information (VUI) parameter set fragments (not depicted). The parser 254 parses (entropy-decodes) the coded video sequence. The coding of the coded video sequence can be in accordance with a video coding technology or standard, and can follow principles well known to a person skilled in the art, including variable length coding, Huffman coding, arithmetic coding with or without context sensitivity, and so forth. The parser 254 may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 254 may also extract, from the coded video sequence, information such as transform coefficients, quantizer parameter values, motion vectors, and so forth.

Reconstruction of the symbols 270 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 254. The flow of such subgroup control information between the parser 254 and the multiple units below is not depicted for clarity.

The decoder component 122 can be conceptually subdivided into a number of functional units, and in some implementations, these units interact closely with each other and can, at least partly, be integrated into each other. However, for clarity, the conceptual subdivision of the functional units is maintained herein.

The scaler/inverse transform unit 258 receives quantized transform coefficients as well as control information (such as which transform to use, block size, quantization factor, and/or quantization scaling matrices) as symbol(s) 270 from the parser 254. The scaler/inverse transform unit 258 can output blocks including sample values that can be input into the aggregator 268.

In some cases, the output samples of the scaler/inverse transform unit 258 pertain to an intra coded block; that is: a block that is not using predictive information from previously reconstructed pictures, but can use predictive information from previously reconstructed parts of the current picture. Such predictive information can be provided by the intra picture prediction unit 262. The intra picture prediction unit 262 may generate a block of the same size and shape as the block under reconstruction, using surrounding already-reconstructed information fetched from the current (partly reconstructed) picture from the current picture memory 264. The aggregator 268 may add, on a per sample basis, the prediction information the intra picture prediction unit 262 has generated to the output sample information as provided by the scaler/inverse transform unit 258.

In other cases, the output samples of the scaler/inverse transform unit 258 pertain to an inter coded, and potentially motion-compensated, block. In such cases, the motion compensation prediction unit 260 can access the reference picture memory 266 to fetch samples used for prediction. After motion compensating the fetched samples in accordance with the symbols 270 pertaining to the block, these samples can be added by the aggregator 268 to the output of the scaler/inverse transform unit 258 (in this case called the residual samples or residual signal) so to generate output sample information. The addresses within the reference picture memory 266, from which the motion compensation prediction unit 260 fetches prediction samples, may be controlled by motion vectors. The motion vectors may be available to the motion compensation prediction unit 260 in the form of symbols 270 that can have, for example, X, Y, and reference picture components. Motion compensation can include interpolation of sample values (as fetched from the reference picture memory 266) when subsample motion vectors are used, motion vector prediction mechanisms, and so forth.

The output samples of the aggregator 268 can be subject to various loop filtering techniques in the loop filter unit 256. Video compression technologies can include in-loop filter technologies that are controlled by parameters included in the coded video bitstream and made available to the loop filter unit 256 as symbols 270 from the parser 254, but can also be responsive to meta-information obtained during the decoding of previous (in decoding order) parts of the coded picture or coded video sequence, as well as responsive to previously reconstructed and loop-filtered sample values. The output of the loop filter unit 256 can be a sample stream that can be output to a render device such as the display 124, as well as stored in the reference picture memory 266 for use in future inter-picture prediction.

Certain coded pictures, once reconstructed, can be used as reference pictures for future prediction. Once a coded picture is reconstructed and the coded picture has been identified as a reference picture (by, for example, parser 254), the current reference picture can become part of the reference picture memory 266, and a fresh current picture memory can be reallocated before commencing the reconstruction of the following coded picture.

The decoder component 122 may perform decoding operations according to a predetermined video compression technology that may be documented in a standard, such as any of the standards described herein. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 3:
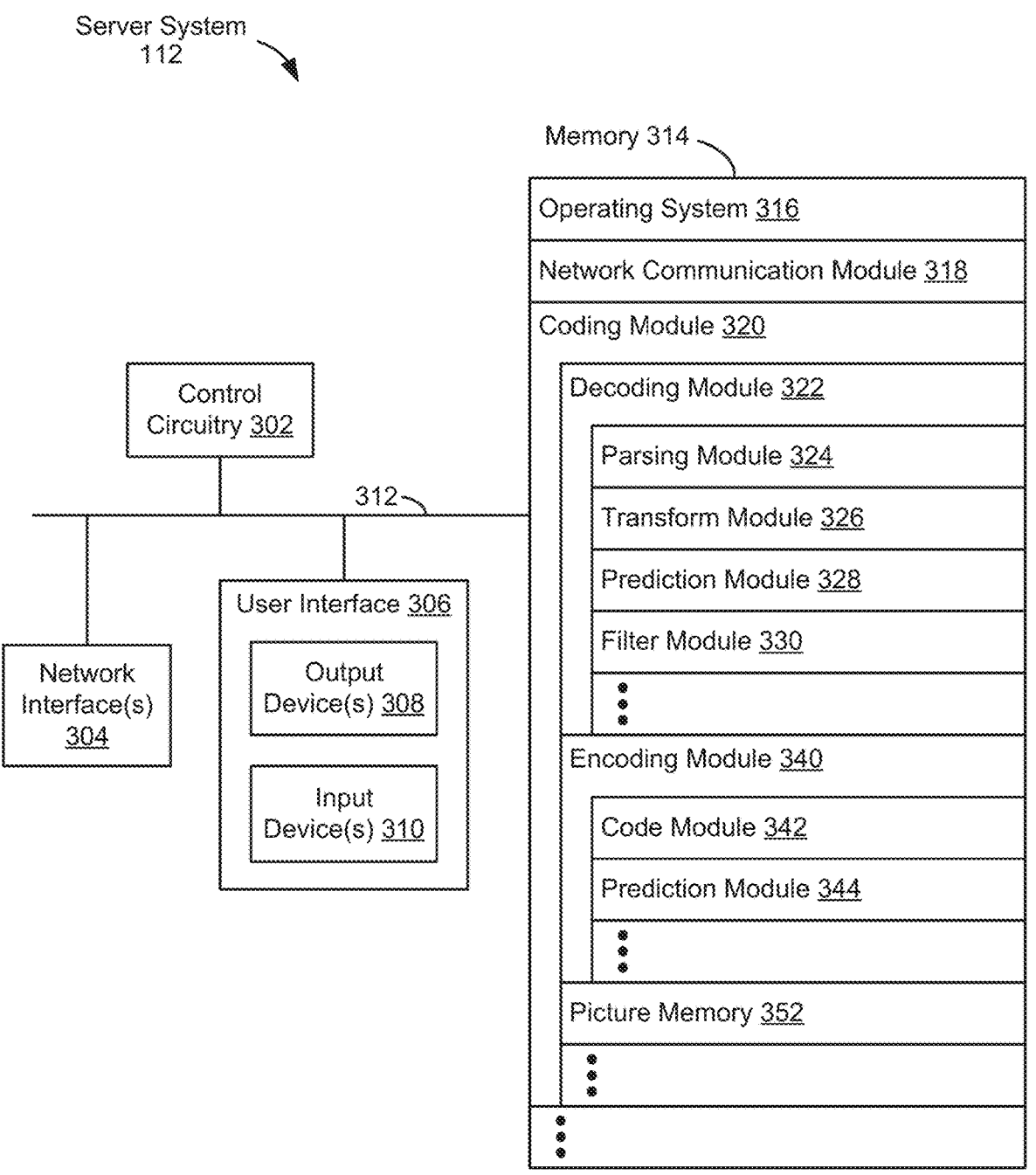
FIG. 3 is a block diagram illustrating an example server system in accordance with some embodiments.

FIG. 3 is a block diagram illustrating the server system 112 in accordance with some embodiments. The server system 112 includes control circuitry 302, one or more network interfaces 304, a memory 314, a user interface 306, and one or more communication buses 312 for interconnecting these components. In some embodiments, the control circuitry 302 includes one or more processors (e.g., a CPU, GPU, and/or DPU). In some embodiments, the control circuitry includes field-programmable gate array(s) (FP-GAs), hardware accelerator(s), and/or integrated circuit(s) (e.g., an application-specific integrated circuit).

The network interface(s) 304 may be configured to interface with one or more communication networks (e.g., wireless, wireline, and/or optical networks). The communication networks can be local, wide-area, metropolitan, vehicular and industrial, real-time, delay-tolerant, and so on. Examples of communication networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Such communication can be unidirectional, receive only (e.g., broadcast TV), unidirectional send-only (e.g., CANbus to certain CANbus devices), or bi-directional (e.g., to other computer systems using local or wide area digital networks). Such communication can include communication to one or more cloud computing networks.

The user interface 306 includes one or more output devices 308 and/or one or more input devices 310. The input device(s) 310 may include one or more of: a keyboard, a mouse, a trackpad, a touch screen, a data-glove, a joystick, a microphone, a scanner, a camera, or the like. The output device(s) 308 may include one or more of: an audio output device (e.g., a speaker), a visual output device (e.g., a display or monitor), or the like.

The memory 314 may include high-speed random-access memory (such as DRAM, SRAM, DDR RAM, and/or other random access solid-state memory devices) and/or non-volatile memory (such as one or more magnetic disk storage devices, optical disk storage devices, flash memory devices, and/or other non-volatile solid-state storage devices). The memory 314 optionally includes one or more storage devices remotely located from the control circuitry 302. The memory 314, or, alternatively, the non-volatile solid-state memory device(s) within the memory 314, includes a non-transitory computer-readable storage medium. In some embodiments, the memory 314, or the non-transitory computer-readable storage medium of the memory 314, stores the following programs, modules, instructions, and data structures, or a subset or superset thereof:

an operating system 316 that includes procedures for handling various basic system services and for performing hardware-dependent tasks;

a network communication module 318 that is used for connecting the server system 112 to other computing devices via the one or more network interfaces 304 (e.g., via wired and/or wireless connections);

a coding module 320 for performing various functions with respect to encoding and/or decoding data, such as video data. In some embodiments, the coding module 320 is an instance of the coder component 114. The coding module 320 including, but not limited to, one or more of:

a decoding module 322 for performing various functions with respect to decoding encoded data, such as those described previously with respect to the decoder component 122; and an encoding module 340 for performing various functions with respect to encoding data, such as those described previously with respect to the encoder component 106; and a picture memory 352 for storing pictures and picture data, e.g., for use with the coding module 320. In some embodiments, the picture memory 352 includes one or more of: the reference picture memory 208, the buffer memory 252, the current picture memory 264, and the reference picture memory 266.

In some embodiments, the decoding module 322 includes a parsing module 324 (e.g., configured to perform the various functions described previously with respect to the parser 254), a transform module 326 (e.g., configured to perform the various functions described previously with respect to the scalar/inverse transform unit 258), a prediction module 328 (e.g., configured to perform the various functions described previously with respect to the motion compensation prediction unit 260 and/or the intra picture prediction unit 262), and a filter module 330 (e.g., configured to perform the various functions described previously with respect to the loop filter 256).

In some embodiments, the encoding module 340 includes a code module 342 (e.g., configured to perform the various functions described previously with respect to the source coder 202 and/or the coding engine 212) and a prediction module 344 (e.g., configured to perform the various functions described previously with respect to the predictor 206). In some embodiments, the decoding module 322 and/or the encoding module 340 include a subset of the modules shown in FIG. 3. For example, a shared prediction module is used by both the decoding module 322 and the encoding module 340.

Each of the above identified modules stored in the memory 314 corresponds to a set of instructions for performing a function described herein. The above identified modules (e.g., sets of instructions) need not be implemented as separate software programs, procedures, or modules, and thus various subsets of these modules may be combined or otherwise re-arranged in various embodiments. For example, the coding module 320 optionally does not include separate decoding and encoding modules, but rather uses a same set of modules for performing both sets of functions. In some embodiments, the memory 314 stores a subset of the modules and data structures identified above. In some embodiments, the memory 314 stores additional modules and data structures not described above.

Although FIG. 3 illustrates the server system 112 in accordance with some embodiments, FIG. 3 is intended more as a functional description of the various features that may be present in one or more server systems rather than a structural schematic of the embodiments described herein. In practice, and as recognized by those of ordinary skill in the art, items shown separately could be combined and some items could be separated. For example, some items shown separately in FIG. 3 could be implemented on single servers and single items could be implemented by one or more servers. The actual number of servers used to implement the server system 112, and how features are allocated among them, will vary from one implementation to another and, optionally, depends in part on the amount of data traffic that the server system handles during peak usage periods as well as during average usage periods.

Example Coding Techniques

The coding processes and techniques described below may be performed at the devices and systems described above (e.g., the source device 102, the server system 112, and/or the electronic device 120). In the following, a block may refer to a coding tree block, the largest coding block, a predefined fixed block size, a coding block, a prediction block, a residual block, or a transform block (e.g., based on context). An intra-coded block refers to a block that is coded using an intra prediction mode. An inter-coded block refers to a block that is coded using an inter prediction mode. An intra mode list may refer to a list of the most probable intra prediction modes for the current block. Non-separable transform kernels are grouped into sets denoted by set indices and kernel indices (within a set).

As discussed above, a block may be inter coded or intra coded (or intra-inter coded). In some embodiments, a flag is used to indicate that a region or block is coded in an intra-inter coding mode. An intra-inter coding mode refers to a coding mode that generates prediction block with both intra and inter predictions. An example intra-inter coding mode derives the prediction block as a (weighted) sum of an intra prediction block and an inter prediction block.

Figure 4:
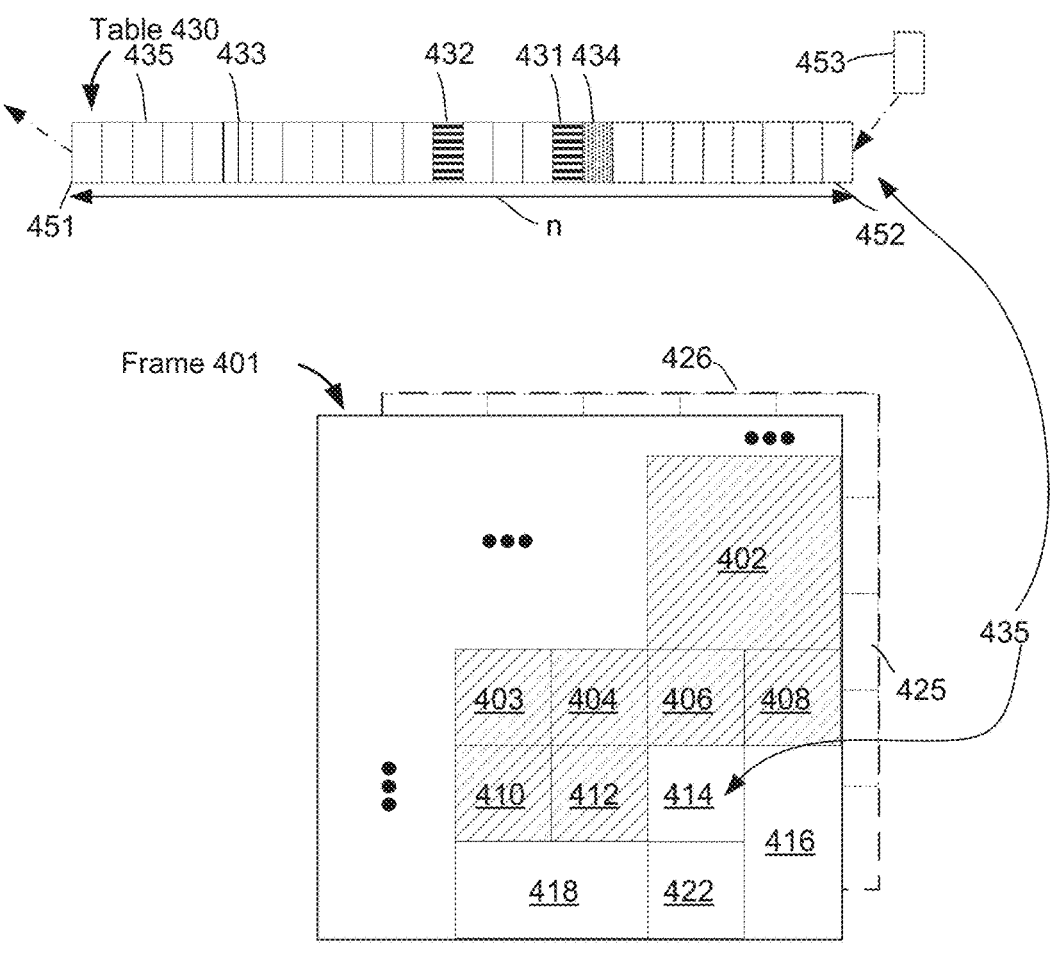
FIG. 4 illustrates an example of using and generating an intra prediction mode table in accordance with some embodiments.

FIG. 4 illustrates an example of generating and using an intra prediction mode table in coding (e.g., encoding or decoding) of a block using an intra prediction mode. A frame 401 includes blocks of different sizes (e.g., blocks 403, 404, 406, 408, 410, 412, 414, and 422 are square blocks of a first size, while block 402 is a square block of a larger size, and rectangular blocks 418 and 416). In some embodiments, the blocks in frame 401 are coded from the top left corner and downwards until the last block on the lower right corner of frame 401. The shaded blocks in the frame 401 denote blocks that have been decoded, while the unshaded blocks denote blocks that not yet been decoded. For simplicity, only a subset of the blocks in the frame 401 is shown (e.g., intervening blocks coded after the block 402 but before the block 403 are not shown) in FIG. 4. An intra prediction mode table 430 keeps a record of intra prediction modes used by, or derived from, previously encoded or decoded blocks. The description below is based on decoding of blocks in the frame 401, but would apply analogously to the encoding of blocks using the intra prediction mode table.

In some embodiments, the intra prediction mode table is a First-In-First-Out (FIFO) queue of some fixed or predefined size n. The table 430 is depicted in FIG. 4 as a linear sequence of entries. Optionally, table 430 may be arranged as a 2D array or 3D volume of entries. The table 430 lists intra prediction modes that are used by, or derived from, recently decoded blocks (e.g., the most recently decoded blocks). The entries of the table 430 are optionally maintained and/or stored in a buffer at the decoding component (e.g., stored at DRAM or SRAM memory at the decoding component, such as the memory 314). Such an approach may allow a larger table to be maintained and/or be updated at a lower cost, without requiring signaling the content of the table 430 into the video bitstream. As an example, the block 414 is the current block to be decoded, and the block 412 is decoded immediately preceding the decoding of current block 414. The table 430 includes an entry 431 that records the intra prediction mode used to decode the block 412 (e.g., the entry 431 indicates that the block 412 is decoded using a first non-directional smooth mode, SMOOTH_H_PRED), and an entry 433 recording the intra prediction mode used to decode the block 408 (e.g., the entry 433 indicates that the block 408 is decoded using a second non-directional smooth mode, TM_PRED).

In some embodiments, the table 430 is maintained on the fly and is updated after a current block is decoded. For example, after the block 414 has been decoded, the table 430 is updated with an additional entry 434, that is added behind the entry 431, to denote the intra prediction mode used to decode the block 414.

As mentioned above, the table 430 may be implemented using a FIFO queue (and an associated buffer). Thus, various (e.g., all) input/output operations that can be performed on a FIFO queue are applicable to the table 430. For example, the intra prediction mode that is used by, or derived from, the most recently decoded block (e.g., block 414) is added to the end of the table 430 (e.g., after the last filled entry in the table 430 of entry 431). For example, if the table 430 is full (e.g., last entry corresponding to entry 452 is filled with a record of the intra prediction mode of a block), an entry 451 at the front (e.g., beginning) of the table 430 is removed (corresponding to an earliest decoded block), and a subsequent entry 453 is added (e.g., appended) to the end of the table 430 with a record of the intra prediction mode used to decode the most recently decoded block.

In some embodiments, a redundancy check is performed before adding a record of an intra prediction mode to the table (e.g., to avoid duplicating intra prediction modes in the table). For example, the fill patterns in the table 430 denote respective intra prediction modes. If a second instance of a first intra prediction mode (e.g., a redundant intra prediction mode) is found at a first location in the intra prediction mode table, the second instance of the first prediction mode is removed and all the intra prediction modes behind the second instance of the first intra prediction mode are shifted forward (e.g., to occupy the first location vacated by the second instance of the first prediction mode). For example, the entry 431 records the same intra prediction mode as the entry 432 (e.g., a DC mode). In response to detecting the presence of the entry 431 at the first position recording the same intra prediction mode as the entry 432, the entry 431 is removed from the first position, and the one or more entries behind entry 431 are shifted forward (e.g., towards the left in FIG. 4), to fill the space vacated by the removal of the entry 431 at the first position. Optionally, the second instance of the DC mode (recorded in the entry 431) is added to at the end of the table 430. For example, the end of the table 430 may correspond to the entry 452, when entries before 452 are filled. Otherwise, the first vacant slot, after the last filled slot, in the table 430 is used.

In some embodiments, a counter is used for each entry of the table to keep track of the number of times a respective intra prediction mode associated with an entry in the intra prediction mode table is used. For example, a counter may be associated with the entry 432, and is incremented (e.g., by one) in response to detecting the presence of entry 431 that is decoded using the same intra prediction mode. In some embodiments, the value of counter is used to determine the relative order of intra prediction modes in the table. For example, the table 430 is updated by shifting the entry 432 to the front (e.g., beginning) of the table 430 when the counter associated with entry 432 has a highest value among all the counters associated with the entries in the table 430. Optionally, the ordering of the entries in the table 430 is similar to the ordering used in a motion vector bank.

In some embodiments, the value of the counter is determined by not only the number of times a respective intra prediction mode associated with an entry in the intra prediction mode table has been used, but also the relative coordinate of the preceding blocks which are coded using the associated intra prediction mode. For example, the preceding block having the same intra prediction mode may be an edge block. An edge block may refer to an edge block of the frame 401, such as the block 408 on the right edge of the frame 401, or a block that is at an above edge or left edge of the current block, such as the above block 406 of the current block 414, and the left block 412 of the current block 414. As a result, the counter associated with the intra prediction mode of the edge block is incremented by a larger amount.

In some embodiments, the value of the counter is determined not only by the number of times the respective intra prediction mode associated with the entry has been used, but also the block sizes of the preceding blocks which are coded using the associated intra prediction mode. For example, both a 64×64 block and a 8×8 block may be coded using the same intra prediction mode. If the current block is an 8×8 block, the counter for the 64×64 may be skipped (e.g., not incremented) while the counter for the 8×8 block is incremented. As another example, if block 414 is the current block and is to be decoded using the same intra prediction mode as both the block 402 and the block 410, then the counter associated with the entry corresponding to the block 410 is incremented, due to the similarity in the block sizes of the current block 414 and the preceding block 410.

In some embodiments, a size (e.g., the length n) of the FIFO queue is determined (e.g., adjusted, or adapted) based on bitrates or quantization levels. In some embodiments, a size of the FIFO queue is signaled in the bitstream. For example, if the quantization parameter is large, a smaller buffer may be maintained for the table 430. A large quantization parameter results in spatial details in the samples being aggregated, reducing the bitrate but potentially increasing the distortion that may result in some loss of quality. Optionally, a high quantization may optionally indicate that blocks (e.g., in the frame) are inter-coded. In some embodiments, the size of the FIFO queue is signaled in HLS of the bitstream (e.g., a picture level, frame level, sequence level, or GOP level).

In some embodiments, if the latest decoded block (e.g., the last decoded, the most recently decoded) is an intra-coded block, the corresponding intra prediction mode is added to the end of intra prediction mode table. For example, for the current block 414, the latest decoded block is the block 412. If the block 412 is coded using an intra prediction mode, that intra prediction mode is added to the end of the table 430 (immediately behind the entry 434 if the entry 434 corresponds to the last inserted entry to the table 430).

In some embodiments, if the latest decoded block (e.g., the last decoded, and/or the most recently decoded) is an inter block, the intra prediction mode table is not updated. Alternatively, an intra prediction mode is first derived from coded information (e.g., reconstructed samples, or prediction values (e.g., pixel values, or information from a histogram) of the inter block, and the derived intra prediction mode is considered a closest intra mode that is used to fill the table. For example, the current block 414 is an inter-coded block, and a block 425 in a reference frame 426 is the reference block for the current block 414. In such a case, an intra mode may be derived based on the prediction values obtained from the reference block 425 for the current block 414.

Figure 5:
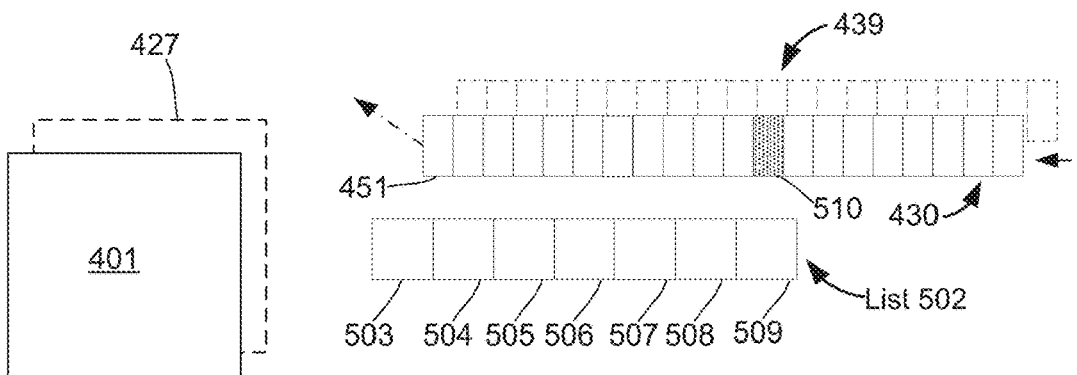
FIG. 5 illustrates an example of using and generating an intra prediction mode table in accordance with some embodiments.

This derived intra prediction mode is added to the end of intra prediction mode table, or to a separate table 439, illustrated in FIG. 5, maintained for the derived intra prediction modes. For example, one intra prediction mode table (e.g., table 430) is maintained for intra prediction modes obtained from intra-coded blocks, and a separate table (e.g., table 439) is maintained for the intra prediction modes derived from inter-coded blocks.

In some embodiments, blocks that are non-adjacent to the current block are checked when building the intra prediction mode table. For example, blocks that are N columns to the left and/or up M rows blocks are checked. For a current block 414, the blocks two rows up (e.g., the row that includes the block 412) may be checked prior to adding an entry for the intra prediction mode of the current block 414 into the table 430.

In some embodiments, a flag is signaled into the bitstream for each coded block to indicate whether the prediction mode of current block is from this intra prediction mode table or not. For example, a binary flag may be used. In this example, if the flag carries a value of "1", the intra prediction mode listed at the end of the table is used to decode the current block. If the flag carries a value of "0", the intra prediction mode table is not used, and the intra prediction mode to be used is instead directly signaled.

In some embodiments, the intra prediction mode table is refreshed at a frame, a slice, a segment, or a row of superblock level. For example, the refresh of intra prediction mode table is performed by setting the intra prediction mode table with a default list of intra prediction modes. The default list of intra prediction modes may include predefined prediction modes such as DC (e.g., DC_PRED), planar prediction (e.g., vertical, horizontal), non-directional smooth modes (e.g., TM_PRED, SMOOTH_H_PRED, SMOOTH_V_PRED, SMOOTH_PRED). In some embodiments, the default mode corresponds to a collocated block (e.g., block located in the same position) from the reference frame. In some embodiments, the refresh of intra prediction mode table includes clearing the intra prediction mode table to become empty (e.g., with no content). For example, after all the blocks in the frame 401 have been decoded, a next frame 427 is then decoded (shown in FIG. 5). The table 430 maintained for the frame 401 may be reset or refreshed (with default intra prediction modes or with cleared with no content), as depicted by a new table 439 in FIG. 5.

In some embodiments, the entries in the intra prediction mode table are used for intra mode coding, e.g., used in an intra mode list generation process within the intra mode coding process. In some embodiments, the intra prediction modes in the table 430 are added into an intra mode list 502 after inserting the intra prediction modes of the neighboring blocks if they are available and intra coded. For example, elements 503, 504, 505, and 506 corresponding to the intra prediction modes of blocks 412, 414, 416 and 418, which are neighboring blocks of the block 422 are added in the list 502 before the entry in the table 430 corresponding to the intra prediction of the block 422 (e.g., element 509) is added to the list 502. In some embodiments, the intra prediction modes in the intra prediction mode table are added into the intra mode list before one or more default intra prediction modes are added to the intra mode list. For example, the elements 503, 504, 505 and 506 correspond to entries added to the list 502 from the intra prediction mode table 430 while elements 507, 508 and 509 correspond to default intra prediction modes such as DC prediction modes, planar prediction modes, smooth modes non-directional mode. In some embodiments, non-directional modes are more frequently used than directional modes because more content is likely to be smooth, statistically.

The list 502 may be created dynamically (e.g., on the fly) by looking to edges (e.g., the left block and the above block) of a current block (e.g., from the table 430) and inserting the intra prediction modes associated with those blocks into the list 502. The list 502 is optionally filled with default intra prediction modes described above. In this way, information from previously coded blocks is used to fill the list 502. An index may be signaled to indicate which mode from the list 502 should be used to decode a particular block (e.g., a current block). The use of the table 430 may allow faster access to intra prediction modes of neighboring blocks. Further, the table 430 allows more memory (e.g., in a buffer memory of a decoding component), and more data to be accessible than just the neighboring blocks of any current block.

For example, some neighboring blocks to the current block may not be intra-coded. In such a scenario, the intra prediction mode list for the current block may not have entries for those blocks. In contrast, the table 430 may include intra mode information for earlier blocks (e.g., including non-adjacent blocks) and may include intra modes derived from the non-intra coded blocks, e.g., because more data is stored in the table 430 than in an intra mode list. Further, intra mode lists that are generated without the table 430 may be hardware intensive, and such an intra mode list may not be generated for a smaller block. In contrast, the table 430 may be stored in RAM (e.g., DRAM), and information from the table 430 may be copied into the intra mode list 502.

In some embodiments, a subset of the intra prediction modes in the intra prediction mode table are added into the intra prediction mode list. For example, the first N (e.g., from the N most recently decoded or encoded blocks) angular intra prediction modes in the intra prediction mode table may be added into the intra prediction mode list. In some embodiments, N is a positive integer, such as 1 or 2.

Each pixel block in the frame 401 may be processed in a predictive-transform coding scheme, where a prediction is obtained using intra frame reference pixels, inter frame motion compensation, or some combinations of the two. The residuals from the prediction may undergo a transform (e.g., a 2-D unitary transform) to further remove spatial correlations and the transform coefficients are quantized. Unlike separable transforms typically used in lower complexity applications, which have a limited compression efficiency for video blocks having arbitrarily directed edge and texture patterns, non-separable transforms may achieve better compression efficiency for directional texture patterns. In some embodiments, the set index of non-separable transforms that are applied to inter prediction residuals is derived from contents of the intra prediction mode table. For example, the non-separable transform maybe a secondary transform on low frequency coefficients generated using a primary separable transform. In some embodiments, the intra prediction mode at the end of the table 430, corresponding to the latest decoded block is used to derive the set index. For example, by taking an entry from the end of the table 430, the decoding component determines the transform kernel to be used for the current block based on that entry. Such a process may be an additional way in which the table 430 may be used. Intra prediction mode lists that are generated without the table 430 are generally not created for inter-coded blocks.

The blocks illustrated in FIGS. 4 and 5 may be luma blocks or chroma blocks. In some embodiments, the intra prediction mode table is used only for a first color component (e.g., the luma component) and not used for a second color component (e.g., a chroma color component, Cb, or Cr). In some embodiments, another intra prediction mode table is maintained for the chroma color components (e.g., rather than the same intra prediction mode table being used for both the luma color component and the chroma color components). For example, a first portion of the intra prediction mode table is used for a first color component, and a second portion of the same intra prediction mode table is used for the second color component.

FIG. 6A is a flow diagram illustrating a method 600 of decoding video in accordance with some embodiments. The method 600 may be performed at a computing system (e.g., the server system 112, the source device 102, or the electronic device 120) having control circuitry and memory storing instructions for execution by the control circuitry. In some embodiments, the method 600 is performed by executing instructions stored in the memory (e.g., the memory 314) of the computing system.

The system receives (602) a video bitstream (e.g., a coded video sequence) comprising a current picture, the current picture including a plurality of blocks (e.g., a plurality of encoded video blocks) that includes a current block. The system maintains (604) an intra prediction mode table by adding an entry to the intra prediction mode table based on one or more intra prediction modes used by one or more previously decoded blocks. For example, the system stores the intra prediction mode table in memory and updates the table as blocks of the current frame are decoded. The system populates (606) an intra mode prediction list for the current block by selecting one or more entries from the intra prediction mode table to populate the intra mode prediction list. The system reconstructs (608) the current block using an intra prediction mode selected from the intra prediction mode list.

FIG. 6B is a flow diagram illustrating a method 650 of encoding video in accordance with some embodiments. The method 650 may be performed at a computing system (e.g., the server system 112, the source device 102, or the electronic device 120) having control circuitry and memory storing instructions for execution by the control circuitry. In some embodiments, the method 650 is performed by executing instructions stored in the memory (e.g., the memory 314) of the computing system.

The system receives (652) video data that includes a plurality of blocks. The system maintains (654) an intra prediction mode table by adding an entry to the intra prediction mode table based on one or more intra prediction modes used by one or more previously encoded blocks. For example, the system stores the intra prediction mode table in memory and updates the table as blocks of the current frame are encoded. The system populates (656) an intra mode prediction list by selecting one or more entries from the intra prediction mode table to populate the intra mode prediction list. The system encodes (658) a current block using an intra prediction mode selected from the intra prediction mode list. As described previously, the encoding process may mirror the decoding processes described herein (e.g., regarding the use of the intra prediction mode table for coding of blocks). For brevity, those details are not repeated here.

Although FIGS. 6A and 6B illustrate a number of logical stages in a particular order, stages which are not order dependent may be reordered and other stages may be combined or broken out. Some reordering or other group-ings not specifically mentioned will be apparent to those of ordinary skill in the art, so the ordering and groupings presented herein are not exhaustive. Moreover, it should be recognized that the stages could be implemented in hard-ware, firmware, software, or any combination thereof.

Turning now to some example embodiments.

(A1) In one aspect, some embodiments include a method (e.g., the method 600) of video decoding. In some embodi-ments, the method is performed at a computing system (e.g., the server system 112) having memory and one or more processors. In some embodiments, the method is performed at a coding module (e.g., the coding module 320). The method includes: (i) receiving a video bitstream that includes a current picture, the current picture including a plurality of blocks that includes a current block, (ii) con-structing (e.g., maintaining) an intra prediction mode table by adding an entry corresponding to an intra prediction mode to the intra prediction mode table based on one or more intra prediction modes used by one or more previously decoded blocks; (iii) deriving (e.g., or populating) an intra mode prediction list for the current block by selecting one or more entries from the constructed intra prediction mode table; and (iv) reconstructing the current block using an intra prediction mode from the intra prediction mode list. For example, an intra prediction mode table is maintained to keep a record of intra prediction modes used by, or derived from, previously encoded or decoded blocks. In some embodiments, the intra mode prediction list is specific to the current block (e.g., a new list is generated for each block of the plurality of blocks), whereas the intra prediction mode table is not block-specific (e.g., is maintained/updated while decoding the plurality of blocks). In some embodiments, the entries in the intra mode table are used for intra mode coding, e.g., the intra mode list generation process used in the intra mode coding process. In some embodiments, a subset of the intra prediction modes in the intra mode table may be added into the intra mode list. For example, only the first N angular intra prediction modes in intra mode table can be added into the intra mode list. N is a positive integer, such as 1 or 2.

(A2) In some embodiments of A1, the intra prediction mode table includes a First-In-First-Out (FIFO) queue of a predefined size, and where entries added to the intra pre-diction mode table (e.g., from a most recently decoded block) are stored in a buffer corresponding to the FIFO queue. In some embodiments, the table is implemented as a First-In-First-Out (FIFO) queue of some fixed/predefined size, where the intra prediction modes used by, or derived from, the most recently decoded blocks are stored in the buffer. For example, all input/output operations that can be performed on a FIFO queue are applicable to the table. 1. In one example, intra mode used by, or derived from, the most recently decoded block is added to the end of the table. 2. In another example, if the table is full, the intra mode corre-sponding to earliest decoded block, is removed before adding the most recently decoded block to the table (e.g., all of the entries of the buffer are shifted). In some embodi-ments, the buffer comprises RAM (e.g., DRAM). In some embodiments, the buffer is a dedicated hardware buffer component.

(A3) In some embodiments of A2, the predefined size is based on a bitrate for the video bitstream and/or a quanti-zation level for the current block. In some embodiments, the FIFO queue size is adaptive (e.g., dynamic) in that it can change during a decoding process. For example, the size of the FIFO queue can adapt based on the bitrates and quan-tization levels. In some embodiments, the size of the FIFO queue is signaled in the bitstream. In some embodiments, the quantization level (and/or the bitrate) is signaled in the video bitstream (e.g., with respective indicators). In some embodi-ments, the size of the FIFO queue is signaled in HLS of the bitstream (e.g., a picture level, frame level, sequence level, or GOP level.

(A4) In some embodiments of any of A1-A3, the intra prediction mode table is updated each time a block from the plurality of blocks is decoded. In some embodiments, the table is maintained on the fly and is updated after encoding/ decoding a block. In some embodiments, the intra prediction mode table is updated each time a block with an intra prediction mode is decoded. In some embodiments, the intra prediction mode table is updated each time a block with a prediction mode that is distinct from any prediction mode in the table is decoded.

(A5) In some embodiments of any of A1-A4, the method further includes performing a redundancy check prior to adding the entry to the intra prediction mode table, the redundancy check being based on the one or more intra prediction modes used by the one or more previously decoded blocks. In some embodiments, to avoid duplicating intra modes in the table, a redundancy check is performed before adding an intra mode to the table. In some embodi-ments, the method includes: (i) while the intra prediction mode table has a first set of prediction modes, identifying a prediction mode for a first block of the plurality of blocks; (ii) when the prediction mode for the first block is different than each of the first set of prediction modes, adding the prediction mode to the intra prediction mode table; and (iii) when the prediction mode for the first block matches at least one prediction mode of the first set of prediction modes, forgoing adding the prediction mode to the intra prediction mode table.

(A6) In some embodiments of A5, performing the redun-dancy check includes: when an instance of a first intra prediction mode is identified at a first location in the intra prediction mode table: removing the instance of the first intra prediction mode from the first location, and adding a second instance of the first intra prediction mode to an end of the intra prediction mode table. In some embodiments, the method includes, after removing the instance of the first intra prediction mode, shifting entries in the intra prediction mode table that are behind the first location to fill the first location. In some embodiments, if a redundant intra mode is found in the table, it is removed and all the intra modes behind it are shifted to the front. Then, the redundant intra mode is added to the end of the table.

(A7) In some embodiments of A5, performing the redun-dancy check includes determining to add the entry to the intra prediction mode table based on a respective counter for each entry of the intra prediction mode table, where the respective counter records a number of occurrences of intra prediction modes associated with respective entries of the intra prediction mode table. In some embodiments, adding the entry to the intra prediction table includes incrementing the corresponding counter. In some embodiments, performing the redundancy check comprises: (i) identifying an intra prediction mode for the entry, (ii) identifying a counter corresponding to the intra prediction mode, (iii) when the counter is less than a threshold value, adding the entry (e.g., an incrementing the counter), and (iv) when the counter is greater than the threshold value, forgoing adding the entry. In some embodiments, a counter is used for each entry of the table to keep track of the number of usages of the intra mode associated with the entry. In some embodiments, the value of counter is used to determine the relative order of intra modes in the table. In some embodiments, the value of counter is based on the relative coordinate of the preceding blocks which are coded using the associated intra mode (e.g., in addition to being based on the number of occurrences). In some embodiments, the value of counter is based on the block sizes of the preceding blocks which are coded using the associated intra mode (e.g., in addition to being based on the number of occurrences). In some embodiments, a single counter is used for a set of (one or more) intra prediction modes). For example, a first counter is used for directional intra prediction modes and a second counter is used for non-directional intra prediction modes.

(A8) In some embodiments of any of A1-A7, the intra prediction mode table is maintained for a first color component. For example, the intra prediction mode table is only used for the first color component (e.g., a luma component or a chroma component). In some embodiments, a separate intra prediction mode table is (concurrently) maintained for a second color component. In some embodiments, maintaining the intra prediction mode table includes adding an entry to the intra prediction mode table based on one or more intra prediction modes used by a first color component of the one or more previously decoded blocks and forgoing adding an entry to the intra prediction mode table for a second color component different from the first component. For example, the methods related to intra prediction mode table, as described above, are only used for a first color component but not used for a second color component. As an example, the first color component is luma color component. As an example, the second color component is a chroma color component.

(A9) In some embodiments of any of A1-A8, the method further includes, when a block is decoded using a first intra prediction mode, adding the first intra prediction mode to the intra prediction mode table. For example, if the latest decoded block is an intra coded block, the corresponding intra prediction mode is added to the end of table. In some embodiments, when a block is decoded using a non-intra prediction mode, the non-intra prediction mode is not added to the intra prediction mode table. In some embodiments, the first intra prediction mode is maintained in the intra prediction mode table until removed to make room for a new entry.

(A10) In some embodiments of any of A1-A9, the method further includes, when a block is decoded using an inter prediction mode: deriving an intra prediction mode based on the inter prediction mode and/or one or more samples of the block; and adding the derived intra prediction mode to the intra prediction mode table. For example, if the latest decoded block is an inter block, an intra prediction mode is first derived from the predicted samples of the inter block. This derived intra prediction mode is added to the end of table.

(A11) In some embodiments of any of A1-A10, the method further includes, when block is decoded using an inter prediction mode, adding a derived intra prediction mode to a second table different from the intra prediction mode table, where the derived intra prediction mode is based on one or more samples of the block. For example, if the latest decoded block is an inter block, an intra prediction mode is first derived from the predicted samples of the inter block. This derived intra prediction mode is added to the end of table. In some embodiments, a separate table may be maintained for the derived intra prediction modes.

(A12) In some embodiments of any of A1-A11, the method further includes identifying a signaled flag in the video bitstream corresponding to a second block; when the signaled flag indicates that the second block is to be decoded using the intra prediction mode table, reconstructing the second block using an intra prediction mode from the intra prediction mode table; and when the signaled flag indicates that the second block is not to be decoded using the intra prediction mode table, reconstructing the second block without using the intra prediction mode table. In some embodiments, the second block is reconstructed using an intra prediction mode from the intra mode prediction list. For example, one flag is signaled into the bitstream for each coded block to indicate whether the prediction mode of current block is from this intra mode table or not. In some embodiments, the signaled flag is signaled in HLS. In some embodiments, the signaled flag is signaled at a block level.

(A13) In some embodiments of any of A1-A12, the method further includes, prior to selecting the one or more entries from the intra prediction mode table, adding one or more intra prediction modes of neighboring blocks of the current block to the intra mode prediction list. In some embodiments, one or more default intra prediction modes are added to the intra mode prediction list prior to selecting the one or more entries from the intra prediction mode table. In some embodiments, the one or more default intra prediction modes are added to the intra mode prediction list after the one or more entries from the intra prediction mode table are added to the intra mode prediction list. For example, the intra prediction modes in intra mode table may be added into the intra mode list after inserting the intra prediction modes of the neighboring blocks if they are available and intra coded. In some embodiments, the intra prediction modes in the intra mode table may be added into the intra mode list before adding the default intra prediction mode into the intra mode list.

(A14) In some embodiments of any of A1-A13, the one or more previously decoded blocks are not adjacent to the current block. In some embodiments, adding the entry to the intra prediction mode table based on the one or more intra prediction modes used by the one or more previously decoded blocks comprises checking intra prediction modes of decoded blocks that are not adjacent to the current block. For example, when building the intra mode table, the non-adjacent blocks are checked. For example, N columns to the left and up to M rows blocks are checked.

(A15) In some embodiments of any of A1-A14, the method further includes deriving a transform set index for the current block based on the intra prediction mode table. In some embodiments, the transform set index is derived for one or more blocks predicted using an inter prediction mode (e.g., the transform is to be applied to inter prediction residuals of the one or more blocks). In some embodiments, the transform set index is derived based on the intra prediction mode when a non-separable transform is to be applied to the residuals. For example, when non-separable transforms are applied to inter prediction residuals, the set index may be derived from the intra mode table. In one example, intra mode at the end of the table, corresponding to the latest decoded block, may be used for deriving the set index.

(A16) In some embodiments of any of A1-A15, the method further includes resetting the intra prediction mode table in accordance with a first coding level. For example, the first coding level is a frame, a slice, a segment, or a row of superblock level. In some embodiments, a signaled indicator (e.g., signaled in HLS) indicates the first coding level for resetting the intra prediction mode table. For example, the intra mode table is refreshed at a frame, a slice, a segment, or a row of superblock level. In some embodiments, the refresh of intra mode table is performed by setting the intra mode table with a default list of intra modes. In some embodiments, the refresh of intra mode table is performed by setting the intra mode table to be empty (with no content).

(B1) In another aspect, some embodiments include a method (e.g., the method 650) of video encoding. In some embodiments, the method is performed at a computing system (e.g., the server system 112) having memory and one or more processors. In some embodiments, the method is performed at a coding module (e.g., the coding module 320). The method includes: (i) receiving video data that includes a current picture, the current picture including a plurality of blocks; (ii) constructing (e.g., maintaining) an intra prediction mode table by adding an entry corresponding to an intra prediction mode to the intra prediction mode table based on one or more intra prediction modes used by one or more previously encoded blocks; (iii) deriving (e.g., or populating) an intra mode prediction list by selecting one or more entries from the constructed intra prediction mode table (e.g., to populate the intra mode prediction list); and (iv) encoding a current block using an intra prediction mode from the intra prediction mode list.

(B2) In some embodiments of B1, the intra prediction mode table includes a First-In-First-Out (FIFO) queue, and where entries added to the intra prediction mode table are stored in a buffer assigned to the FIFO queue.

(C1) In another aspect, some embodiments include a method of visual media data processing. In some embodiments, the method is performed at a computing system (e.g., the server system 112) having memory and one or more processors. In some embodiments, the method is performed at a coding module (e.g., the coding module 320). The method includes: (i) obtaining a source video sequence that includes a plurality of frames; and (ii) performing a conversion between the source video sequence and a video bitstream of visual media data, where the video bitstream includes: (a) a plurality of encoded blocks corresponding to the plurality of frames; and (b) a signaled flag indicating whether a block of the plurality of encoded blocks is to be decoded using an intra prediction mode table maintained at a decoder component, where the intra prediction mode table is not block-specific.

(C2) In some embodiments of C1, the video bitstream further includes a signaled indicator indicating that the decoder component is to maintain the intra prediction mode table. For example, the signaled indicator is signaled at a higher coding level (e.g., a HLS) than the signaled flag (e.g., a block level).

In another aspect, some embodiments include a computing system (e.g., the server system 112) including control circuitry (e.g., the control circuitry 302) and memory (e.g., the memory 314) coupled to the control circuitry, the memory storing one or more sets of instructions configured to be executed by the control circuitry, the one or more sets of instructions including instructions for performing any of the methods described herein (e.g., A1-A16, B1-B2, C1 and C2 above).

In yet another aspect, some embodiments include a non-transitory computer-readable storage medium storing one or more sets of instructions for execution by control circuitry of a computing system, the one or more sets of instructions including instructions for performing any of the methods described herein (e.g., A1-A16, B1-B2, C1 and C2 above).

Unless otherwise specified, any of the syntax elements described herein may be high-level syntax (HLS). As used herein, HLS is signaled at a level that is higher than a block level. For example, HLS may correspond to a sequence level, a frame level, a slice level, or a tile level. As another example, HLS elements may be signaled in a video parameter set (VPS), a sequence parameter set (SPS), a picture parameter set (PPS), an adaptation parameter set (APS), a slice header, a picture header, a tile header, and/or a CTU header.

It will be understood that, although the terms "first," "second," etc. may be used herein to describe various elements, these elements should not be limited by these terms. These terms are only used to distinguish one element from another. The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "when" can be construed to mean "if" or "upon" or "in response to determining" or "in accordance with a determination" or "in response to detecting" that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context. As used herein, N refers to a variable number. Unless explicitly stated, different instances of N may refer to the same number (e.g., the same integer value, such as the number 2) or different numbers.

The foregoing description, for purposes of explanation, has been described with reference to specific embodiments. However, the illustrative discussions above are not intended to be exhaustive or limit the claims to the precise forms disclosed. Many modifications and variations are possible in view of the above teachings. The embodiments were chosen and described in order to best explain principles of operation and practical applications, to thereby enable others skilled in the art.

25

What is claimed is:

1. A method of video decoding performed at a computing system having memory and one or more processors, the method comprising:

receiving a video bitstream comprising a current picture, the current picture comprising a plurality of blocks including a current block, constructing an intra prediction mode table by adding an entry corresponding to an intra prediction mode to the intra prediction mode table based on one or more intra prediction modes used by one or more previously decoded blocks;

when a block of the plurality of blocks is encoded in an inter prediction mode:

determining a corresponding intra prediction mode based on the inter prediction mode and one or more predicted samples of the block; and updating the intra prediction mode table to include the corresponding intra prediction mode;

deriving an intra mode prediction list for the current block by selecting one or more entries from the constructed intra prediction mode table including the corresponding intra prediction mode; and reconstructing the current block using an intra prediction mode from the intra prediction mode list.

2. The method of claim 1, wherein the intra prediction mode table comprises a First-In-First-Out (FIFO) queue of a predefined size, and wherein entries added to the intra prediction mode table are stored in a buffer corresponding to the FIFO queue.

3. The method of claim 2, wherein the predefined size is based on a bitrate for the video bitstream and/or a quantization level for the current block.

4. The method of claim 1, wherein the intra prediction mode table is updated each time a block from the plurality of blocks is decoded.

5. The method of claim 1, further comprising: performing a redundancy check prior to adding the entry to the intra prediction mode table, the redundancy check being based on the one or more intra prediction modes used by the one or more previously decoded blocks.

6. The method of claim 5, wherein performing the redundancy check comprises:

when an instance of a first intra prediction mode is identified at a first location in the intra prediction mode table:

removing the instance of the first intra prediction mode from the first location, and adding a second instance of the first intra prediction mode to an end of the intra prediction mode table.

7. The method of claim 5, wherein performing the redundancy check comprises: determining to add the entry to the intra prediction mode table based on a respective counter for each entry of the intra prediction mode table, wherein the respective counter records a number of occurrences of intra prediction modes associated with respective entries of the intra prediction mode table.

8. The method of claim 1, wherein the intra prediction mode table is maintained for a first color component.

9. The method of claim 1, further comprising, when a block is decoded using a first intra prediction mode, adding the first intra prediction mode to the intra prediction mode table.

10. The method of claim 1, further comprising:

identifying a signaled flag in the video bitstream corresponding to a second block;

26 when the signaled flag indicates that the second block is to be decoded using the intra prediction mode table, reconstructing the second block using an intra prediction mode from the intra prediction mode table; and when the signaled flag indicates that the second block is not to be decoded using the intra prediction mode table, reconstructing the second block without using the intra prediction mode table.

11. The method of claim 1, further comprising, prior to selecting the one or more entries from the intra prediction mode table, adding one or more intra prediction modes of neighboring blocks of the current block to the intra mode prediction list.

12. The method of claim 1, wherein the one or more previously decoded blocks are not adjacent to the current block.

13. The method of claim 1, further comprising:

deriving a transform set index for the current block based on the intra prediction mode table.

14. The method of claim 1, further comprising resetting the intra prediction mode table in accordance with a first coding level.

15. A computing system, comprising:

control circuitry;

memory; and one or more sets of instructions stored in the memory and configured for execution by the control circuitry, the one or more sets of instructions comprising instructions for:

receiving video data comprising a current picture, the current picture comprising a plurality of blocks;

constructing an intra prediction mode table by adding an entry corresponding to an intra prediction mode to the intra prediction mode table based on one or more intra prediction modes used by one or more previously encoded blocks;

when a block of the plurality of blocks is encoded in an inter prediction mode:

determining a corresponding intra prediction mode based on the inter prediction mode and one or more predicted samples of the block; and updating the intra prediction mode table to include the corresponding intra prediction mode;

deriving an intra mode prediction list by selecting one or more entries from the constructed intra prediction mode table including the corresponding intra prediction mode; and encoding a current block using an intra prediction mode from the intra prediction mode list.

16. The computing system of claim 15, wherein the intra prediction mode table comprises a First-In-First-Out (FIFO) queue, and wherein entries added to the intra prediction mode table are stored in a buffer assigned to the FIFO queue.

17. The computing system of claim 15, wherein the one or more sets of instructions further comprise instructions for signaling an indicator indicating whether the current block is to be decoded using an intra prediction mode table maintained at a decoder component, wherein the intra prediction mode table is not block-specific.

18. The computing system of claim 15, wherein the one or more sets of instructions further comprise instructions for signaling an indicator indicating that the decoder component is to maintain the intra prediction mode table.

19. A non-transitory computer-readable storage medium storing a video bitstream that is generated by a video encoding method, the video bitstream comprising:

encoded information for a plurality of blocks of video data, the plurality of blocks including a current block; and a signaled flag indicating whether the current block is to be decoded using an intra prediction mode table maintained at a decoder component, wherein the intra prediction mode table is not block-specific; and wherein the video encoding method comprises:

constructing an intra prediction mode table by adding an entry corresponding to an intra prediction mode to the intra prediction mode table based on one or more intra prediction modes used by one or more blocks of the plurality of blocks;

when a block of the plurality of blocks is encoded in an inter prediction mode:

determining a corresponding intra prediction mode based on the inter prediction mode and one or more predicted samples of the block; and updating the intra prediction mode table to include the corresponding intra prediction mode;

deriving an intra mode prediction list by selecting one or more entries from the constructed intra prediction mode table including the corresponding intra prediction mode; and encoding the current block using an intra prediction mode from the intra prediction mode list.

20. The non-transitory computer-readable storage medium of claim 19, wherein the video bitstream further comprises a signaled indicator indicating that the decoder component is to maintain the intra prediction mode table.

* * * * *